(12) United States Patent
Sharma et al.

(10) Patent No.: US 11,087,230 B2
(45) Date of Patent: Aug. 10, 2021

(54) DETERMINING AN OPTIMAL REGION IN A TARGET VALUE OPTIMIZATION PROBLEM AND UTILIZING THE OPTIMAL REGION TO PERFORM AN ACTION

(71) Applicant: Accenture Global Solutions Limited, Dublin (IE)

(72) Inventors: Sanjay S. Sharma, New Delhi (IN); Nilesh Kumar Gupta, New Delhi (IN); Samik Adhikary, Frankfurt (DE); Derek P. Levesque, Trumbul, CT (US); Avinna Kumar Sahoo, New Delhi (IN); Rajarshi Bhadra, Kolkata (IN); Ruchika Sachdeva, Bad Soden am Taunus (DE)

(73) Assignee: Accenture Global Solutions Limited, Dublin (IE)

( * ) Notice: Subject to any disclaimer, the term of this patent is extended or adjusted under 35 U.S.C. 154(b) by 433 days.

(21) Appl. No.: 16/147,836

(22) Filed: Sep. 30, 2018

(65) Prior Publication Data
US 2020/0104736 A1    Apr. 2, 2020

(51) Int. Cl.
*G06N 7/00* (2006.01)
*G06N 20/00* (2019.01)

(52) U.S. Cl.
CPC ............ *G06N 7/005* (2013.01); *G06N 20/00* (2019.01)

(58) Field of Classification Search
CPC .... G06N 7/005; G06N 20/00; G06Q 10/0631; G06Q 10/06
See application file for complete search history.

(56) References Cited

PUBLICATIONS

Extended European Search Report for Application No. EP19199087.8, dated Oct. 31, 2019, 9 pages.
Kang S.H., et al., "Multi-objective Mapping Optimization via Problem Decomposition for Many-core Systems", Embedded Systems for Real-time Multimedia (Estimedia), 2012 IEEE 10th Symposium on, IEEE, Oct. 11, 2012, pp. 28-37, XP032383721.

*Primary Examiner* — Robert G Bachner
(74) *Attorney, Agent, or Firm* — Harrity & Harrity, LLP

(57) ABSTRACT

A device receives an optimization problem and a target value and input data for the optimization problem, and specifies constraints for the optimization problem based on the input data. The device identifies an optimization space for the optimization problem based on the constraints and the input data, and divides the optimization space into sub-regions based on the constraints and the input data. The device performs optimizations of a set of the sub-regions, and determines a respective distance of each sub-region, of the set of the sub-regions, from the target value. The device selects a particular sub-region that is a shortest distance from the target value, and selects a vector from the particular sub-region. The device executes the optimization problem using the vector as an initial parameter and to generate results, and utilizes the results to recommend one or more decisions or modify a process.

20 Claims, 15 Drawing Sheets

DETERMINING AN OPTIMAL REGION IN A TARGET VALUE OPTIMIZATION PROBLEM AND UTILIZING THE OPTIMAL REGION TO PERFORM AN ACTION

BACKGROUND

Solving a target value optimization problem includes determining a path between two nodes, or vertices, in a graph, whose sum of edge weights, or values, is as close as possible to a target value. Target value optimization problems arise in a variety of domains, such as scheduling interdependent tasks for working hours of an employee, planning a bicycle trip with a particular duration, and/or the like.

SUMMARY

According to some implementations, a method may include receiving an optimization problem, a target value for the optimization problem, and input data for the optimization problem, and specifying constraints for the optimization problem based on the input data. The method may include identifying an optimization space for the optimization problem based on the constraints and the input data, and dividing the optimization space into a plurality of sub-regions based on the constraints and the input data. The method may include performing optimizations of a set of sub-regions of the plurality of sub-regions, wherein each sub-region, of the set of sub-regions, may include a respective threshold probability of being near the target value, and determining a respective distance of each sub-region, of the set of sub-regions, from the target value. The method may include selecting a particular sub-region, from the set of sub-regions, that is a shortest distance from the target value, wherein the particular sub-region may be selected based on determining the respective distance of each sub-region, of the set of sub-regions, from the target value. The method may include selecting a vector from the particular sub-region, and executing the optimization problem using the vector from the particular sub-region as an initial parameter and to generate results. The method may include utilizing the results to recommend one or more decisions for an entity associated with the optimization problem, or modify a process associated with the optimization problem.

According to some implementations, a device may include one or more memories, and one or more processors, communicatively coupled to the one or more memories, to receive an optimization problem, a target value for the optimization problem, input data for the optimization problem, and constraints for the optimization problem, and identify an optimization space for the optimization problem based on the constraints and the input data. The one or more processors may divide the optimization space into a plurality of sub-regions based on the constraints and the input data, and may rank the plurality of sub-regions based on probabilities of the plurality of sub-regions being near the target value. The one or more processors may identify a set of sub-regions, of the plurality of sub-regions, based on ranking the plurality of sub-regions, and may perform optimizations of the set of sub-regions, wherein each sub-region, of the set of sub-regions, includes a respective threshold probability of being near the target value. The one or more processors may determine a respective distance of each sub-region, of the set of sub-regions, from the target value, and may select a particular sub-region, from the set of sub-regions, that is a shortest distance from the target value, wherein the particular sub-region is selected based on determining the respective distance of each sub-region, of the set of sub-regions, from the target value. The one or more processors may select a vector from the particular sub-region, may execute the optimization problem using the vector from the particular sub-region as an initial parameter and to generate results, and perform one or more actions based on the results.

According to some implementations, a non-transitory computer-readable medium may store instructions that include one or more instructions that, when executed by one or more processors of a device, cause the one or more processors to receive an optimization problem, a target value for the optimization problem, and input data for the optimization problem, and determine whether the optimization problem is a target value optimization problem. When the optimization problem is not the target value optimization problem, the one or more instructions may cause the one or more processors to execute the optimization problem using a non-target value optimization. When the optimization problem is the target value optimization problem, the one or more instructions may cause the one or more processors to specify constraints for the optimization problem based on the input data, identify an optimization space for the optimization problem based on the constraints and the input data, divide the optimization space into a plurality of sub-regions based on the constraints and the input data, perform optimizations of a set of sub-regions of the plurality of sub-regions, wherein each sub-region, of the set of sub-regions, includes a respective threshold probability of being near the target value, determine a respective distance of each sub-region, of the set of sub-regions, from the target value, select a particular sub-region, from the set of sub-regions, that is a shortest distance from the target value, wherein the particular sub-region is selected based on determining the respective distance of each sub-region, of the set of sub-regions, from the target value, select a vector from the particular sub-region, execute the optimization problem using the vector from the particular sub-region as an initial parameter and to generate results, and utilize the results to recommend one or more decisions for an entity associated with the optimization problem or to modify a process associated with the optimization problem.

DETAILED DESCRIPTION

Figure 1A:
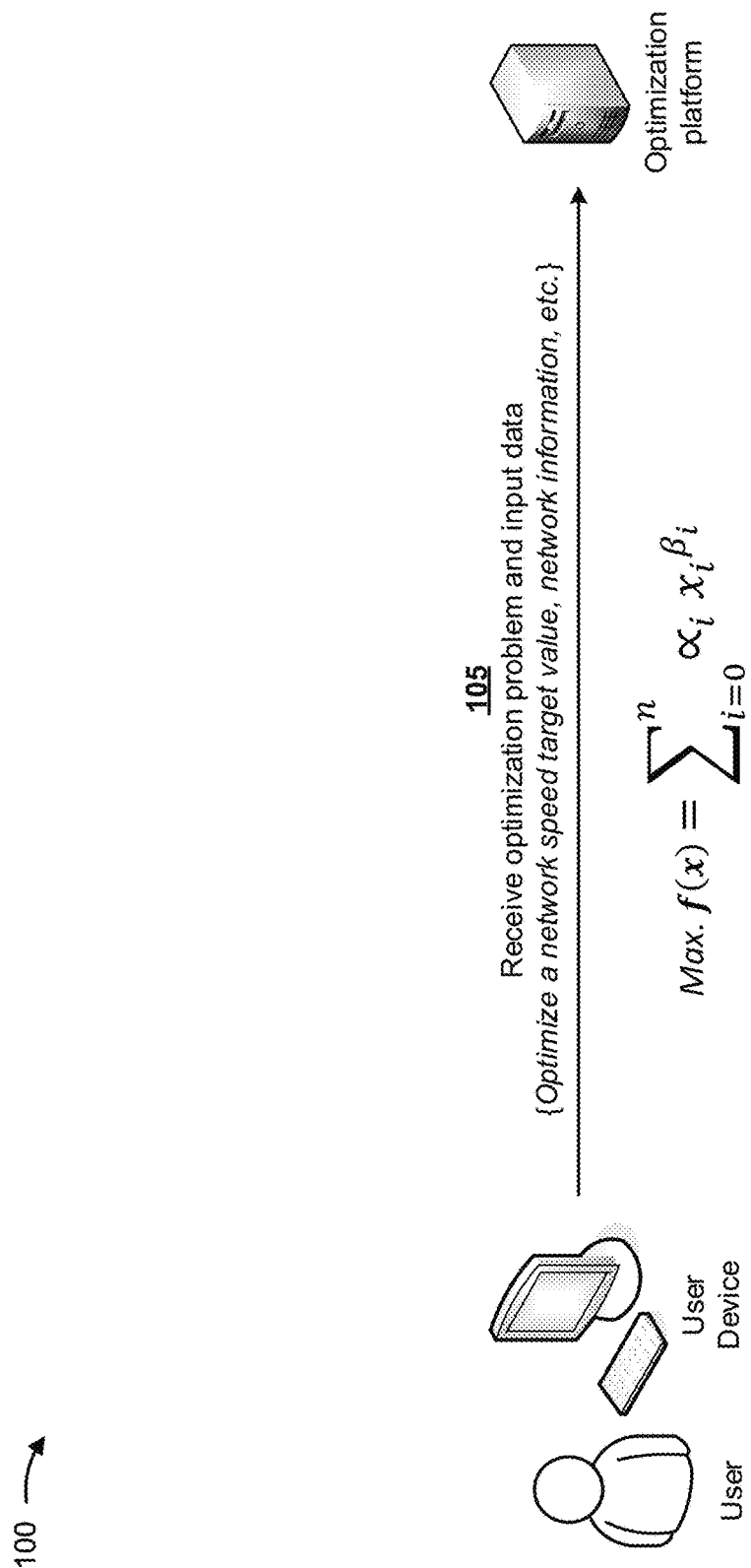
FIGS. 1A-1J are diagrams of an overview of an example implementation described herein.

The following detailed description of example implementations refers to the accompanying drawings. The same reference numbers in different drawings may identify the same or similar elements.

Solving a target value optimization problem presents a huge challenge due to non-convergence of the optimization problem. Non-convergence is directly proportional to a granularity and a complexity in terms of an objective function and a constraint space associated with the optimization problem. With increased granularity, an optimization space becomes large, which makes it difficult to determine optimal points unique to the optimization problem. For example, solving an optimization problem associated with more than one-thousand and three-hundred decision variables (e.g., which is very common for digital marketing problems) may be impossible.

In the absence of standard starting point, solving a target value optimization problem becomes very difficult as a probability of convergence drastically decreases, and an accuracy of a solution may be compromised. For example, some techniques attempt to solve a target value optimization problem by breaking the problem into small parts, aggregating or solving the problem at high level, and distributing a solution at granular level. However, an accuracy of the solution is compromised since interactions among granular-level decision variables are not properly taken into consideration. Other techniques attempt to solve a target value optimization problem by providing an initial vector for the optimization problem based on trial and error or based on standard rules. However, there is a high probability that the initial vector lies far away from the target value and the problem does not converge to the target value.

Some implementations described herein provide an optimization platform that determines an optimal region in a target value optimization problem and utilizes the optimal region to perform an action. For example, the optimization platform may receive an optimization problem, a target value for the optimization problem, and input data for the optimization problem, and may specify constraints for the optimization problem based on the input data. The optimization platform may identify an optimization space for the optimization problem based on the constraints and the input data, and may divide the optimization space into a plurality of sub-regions based on the constraints and the input data. The optimization platform may perform optimizations of a set of sub-regions of the plurality of sub-regions, wherein each sub-region, of the set of sub-regions, may include a respective threshold probability of being near the target value, and may determine a respective distance of each sub-region, of the set of sub-regions, from the target value. The optimization platform may select a particular sub-region, from the set of sub-regions, that is a shortest distance from the target value, wherein the particular sub-region may be selected based on determining the respective distance of each sub-region, of the set of sub-regions, from the target value. The optimization platform may select a vector from the particular sub-region, and may execute the optimization problem using the vector from the particular sub-region as an initial parameter and to generate results. The optimization platform may utilize the results to recommend one or more decisions for an entity associated with the optimization problem, or to modify a process associated with the optimization problem.

In this way, the optimization platform automatically determines an optimal region in an optimization space so that the target value optimization problem converges faster than conventional techniques, which conserves resources (e.g., processing resources, memory resources, and/or the like). Unlike conventional techniques, the optimization platform provides a starting vector that is unique to the target value optimization problem and the constraints of the problem. The optimization platform significantly increases a probability of convergence of the target value optimization problem, and provides real time or near-real time optimization of the target value relative to when the target value optimization problem is received.

FIGS. 1A-1J are diagrams of an overview of an example implementation 100 described herein. As shown in FIG. 1A, a user device may be associated with a user and an optimization platform. As further shown in FIG. 1A, and by reference number 105, the user of the user device (e.g., via a user interface provided to the user) may cause the user device to provide, to the optimization platform, an optimization problem and input data, and the optimization platform may receive the optimization problem and the input data. In some implementations, the optimization problem may include a target value optimization problem, and the input data may include input data for the target value optimization problem. For example, the optimization problem may relate to optimization of a target value for a network speed of a network (e.g., provided to each network subscriber). Furthermore, the input data may relate to information associated with the network, such as information associated with a quantity of network cell towers, a type of access network technology available to the network, a type of bandwidth applied to the network, types of users associated with the network, a quantity of active users of the network, types of websites and/or applications provided by the network, a quantity of active high bandwidth users of the network (e.g., users that stream videos via the network, users downloading a threshold quantity of bytes from the network, and/or the like), and/or the like.

In some implementations, the optimization problem may not include a target value optimization problem, such as a non-goal based optimization problem, an inverse optimization problem, and/or the like.

As further shown in FIG. 1A, the optimization problem may be represented by an objective function, such as:

$$\text{Max} \cdot f(x) = \sum_{i=0}^{n} \alpha_i x_i^{\beta i},$$

where $f(x)$ may correspond to the objective function to be maximized over an n-variable vector x, and $\alpha$ and $\beta$ may correspond to constants. In some implementations, the optimization problem may be a maximization problem or a minimization problem, and may be subject to linear constraints, non-linear constraints, or a combination of linear and non-linear constraints, as described below.

Figure 1B:
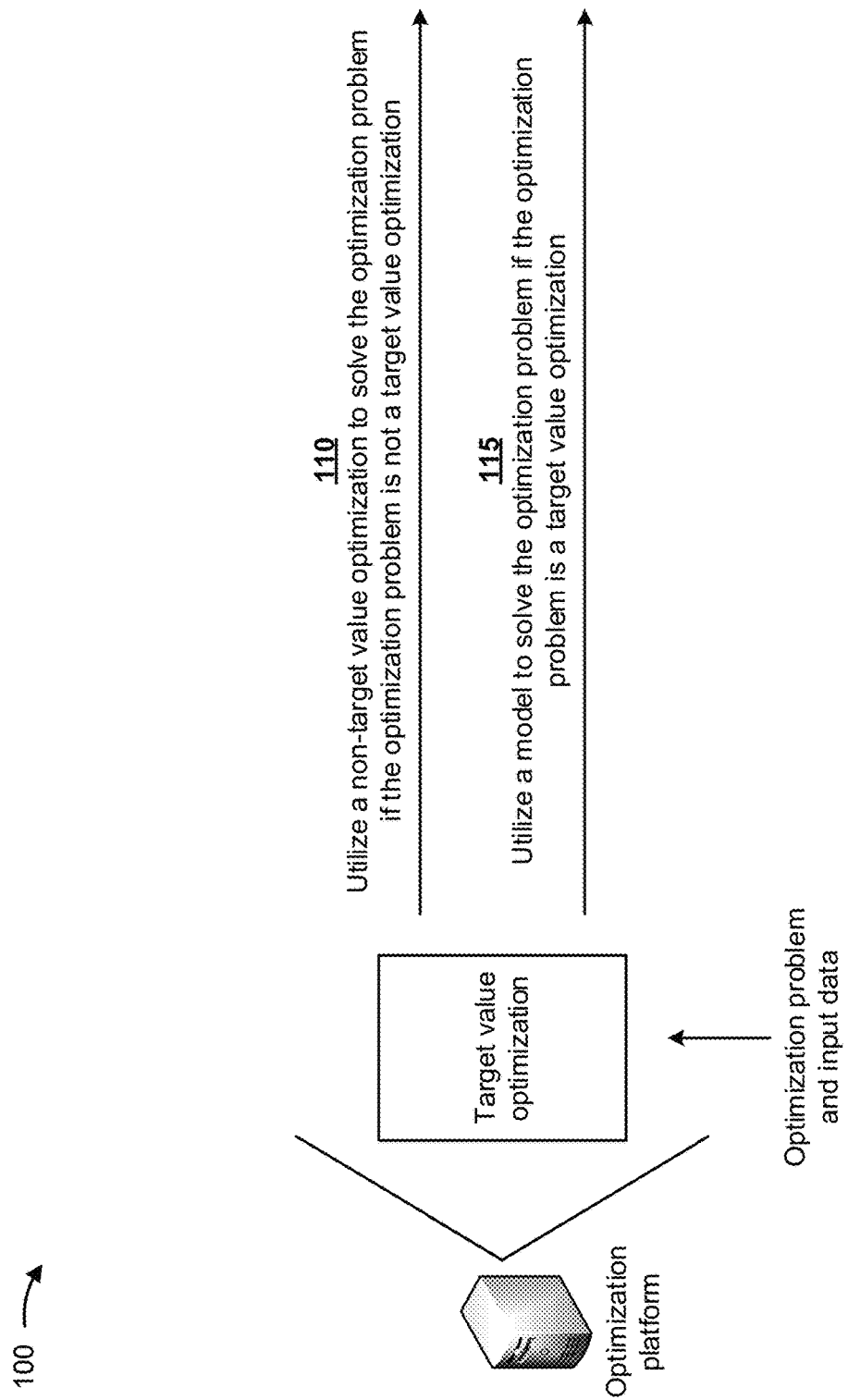

As shown in FIG. 1B, the optimization platform may determine whether the optimization problem is a target value optimization problem. In some implementations, the optimization platform may determine whether the optimization problem is a target value optimization based on whether the optimization problem includes a target value. For example, if the optimization problem relates to optimizing a target value for a network speed of a network, the optimization platform may determine that the optimization problem is a target value optimization problem. In another example, if the optimization problem relates to allocating production of a product to different machines, with different capacities, startup costs, and operating costs, to meet a production target at a minimum cost, the optimization platform may determine that the optimization problem is a target value optimization problem. In some implementations, if the optimization problem does not include a target value, the optimization platform may determine that the optimization problem is not a target value optimization problem.

As further shown in FIG. 1B, and by reference number 110, the optimization platform may utilize a non-target value optimization to solve the optimization problem if the optimization problem is not a target value optimization. In some implementations, the non-target value optimization may include a non-target value optimization model, such as linear regression model, an ordinary least squares model, a simple regression mode, a polynomial regression mode, a general linear model, and/or the like.

As further shown in FIG. 1B, and by reference number 115, the optimization platform may utilize a model to solve the optimization problem if the optimization problem is a target value optimization. In some implementations, the model may include the model described below in connection with FIGS. 1C-1J. In some implementations, the model may include a model that determines an optimal region in the target value optimization problem, and that utilizes the optimal region to solve the optimization problem, perform one or more actions, and/or the like. In some implementations, the model may include a machine learning model that determines an optimal region in a target value optimization problem. In some implementations, the optimization platform may generate a machine learning model (e.g., a support vector machine model, a classifier model, and/or the like) and may reduce a time it takes to generate and train the machine learning model (e.g., conserving resources, such as processing resources, memory resources, and/or the like).

In some implementations, the optimization platform may perform a training operation on the machine learning model with historical target value optimization problems (e.g., historical information that shows optimal regions for target value optimization problems). For example, the optimization platform may separate the historical target value optimization problems into a training set, a validation set, a test set, and/or the like. In some implementations, the optimization platform may train the machine learning model using, for example, an unsupervised training procedure and based on the training set of the historical target value optimization problems. For example, the optimization platform may perform dimensionality reduction to reduce the historical target value optimization problems to a minimum feature set, thereby reducing resources (e.g., processing resources, memory resources, and/or the like) to train the machine learning model, and may apply a classification technique, to the minimum feature set.

In some implementations, the optimization platform may use a logistic regression classification technique to determine a categorical outcome (e.g., that the historical target value optimization problems include optimal regions). Additionally, or alternatively, the optimization platform may use a naïve Bayesian classifier technique. In this case, the optimization platform may perform binary recursive partitioning to split the historical target value optimization problems into partitions and/or branches, and use the partitions and/or branches to perform predictions (e.g., that the historical target value optimization problems include optimal regions). Based on using recursive partitioning, the optimization platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the optimization platform may use a support vector machine (SVM) classifier technique to generate a non-linear boundary between data points in the training set. In this case, the non-linear boundary is used to classify test data into a particular class.

Additionally, or alternatively, the optimization platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the optimization platform may use one or more other model training techniques, such as a neural network technique, a latent semantic indexing technique, and/or the like. For example, the optimization platform may perform an artificial neural network processing technique (e.g., using a two-layer feed-forward neural network architecture, a three-layer feedforward neural network architecture, and/or the like) to perform pattern recognition with regard to optimal regions of the historical target value optimization problems. In this case, using the artificial neural network processing technique may improve an accuracy of the trained machine learning model generated by the optimization platform by being more robust to noisy, imprecise, or incomplete data, and by enabling the optimization platform to detect patterns and/or trends undetectable to human analysts or systems using less complex techniques.

Figure 1C:
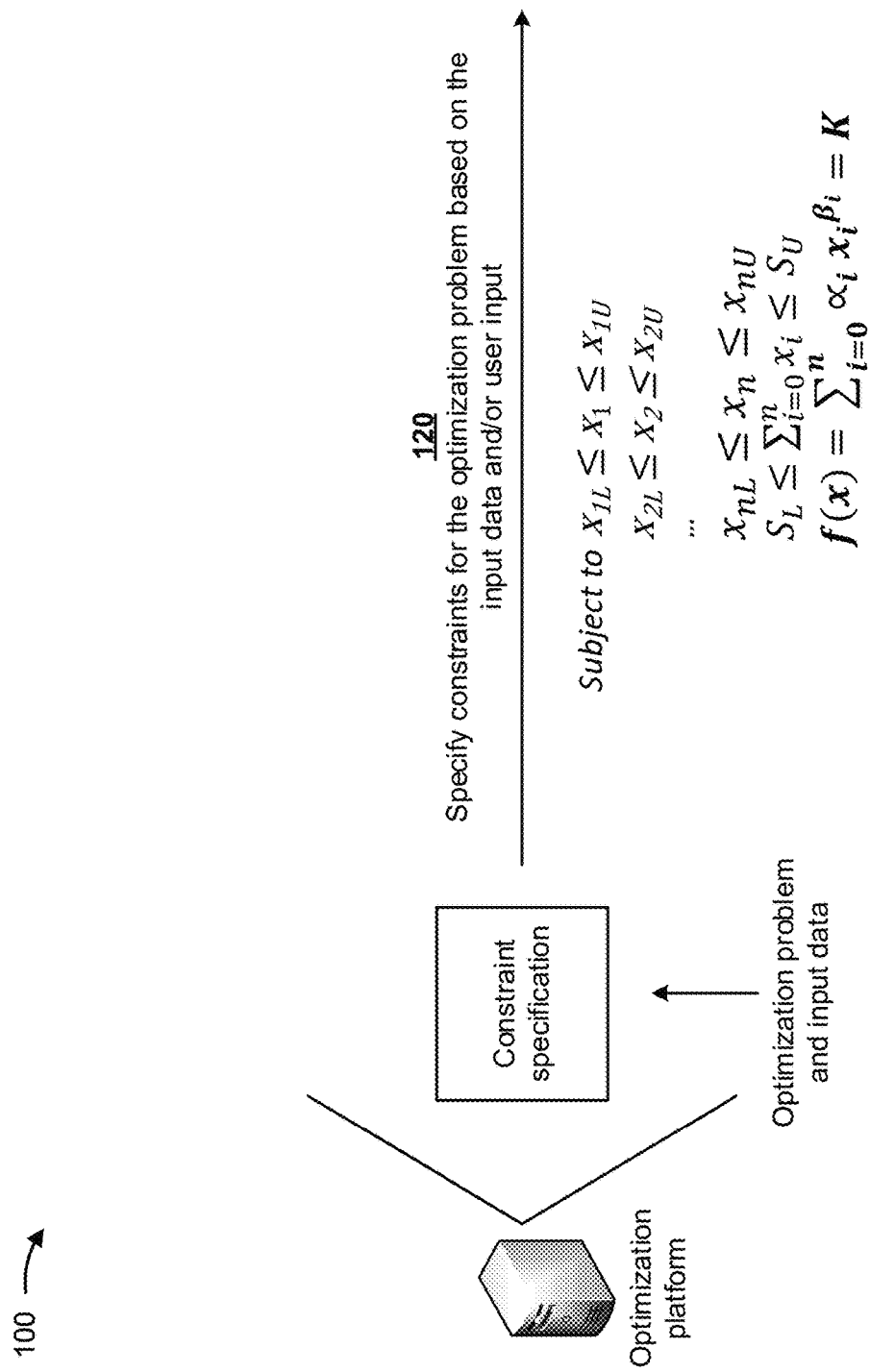

As shown in FIG. 1C, and by reference number 120, the optimization platform may specify constraints for the optimization problem based on the input data and/or user input. In some implementations, the user may provide constraints for the optimization problem (e.g., via user input), and the optimization platform may specify the provided constraints for the optimization problem. In some implementations, the optimization platform may define the constraints for the optimization problem based on the optimization problem. In some implementations, the optimization platform may specify linear constraints, non-linear constraints, or linear and non-linear constraints for the optimization problem (e.g., for the n-variable vector x) as follows:

$$x_{1L} \leq x_1 \leq x_{1U}$$

$$x_{2L} \leq x_2 \leq x_{2U}$$

$$\ldots$$

$$x_{nL} \leq x_n \leq x_{nU}$$

$$S_L \leq \sum_{i=0}^{n} x_i \leq S_U$$

$$f(x) = \sum_{i=0}^{n} \alpha_i x_i^{\beta i} = K,$$

where $f(x)$ and $K$ may correspond to the objective function to be maximized over an n-variable vector x, $\alpha$ and $\beta$ may correspond to constants, and S may correspond to a sub-region. For example, with regard to the network speed example discussed above, the optimization platform may specify constraints for the optimization problem based on the quantity of network cell towers, the type of access network technology available to the network, the type of bandwidth applied to the network, and/or the like.

Figure 1D:
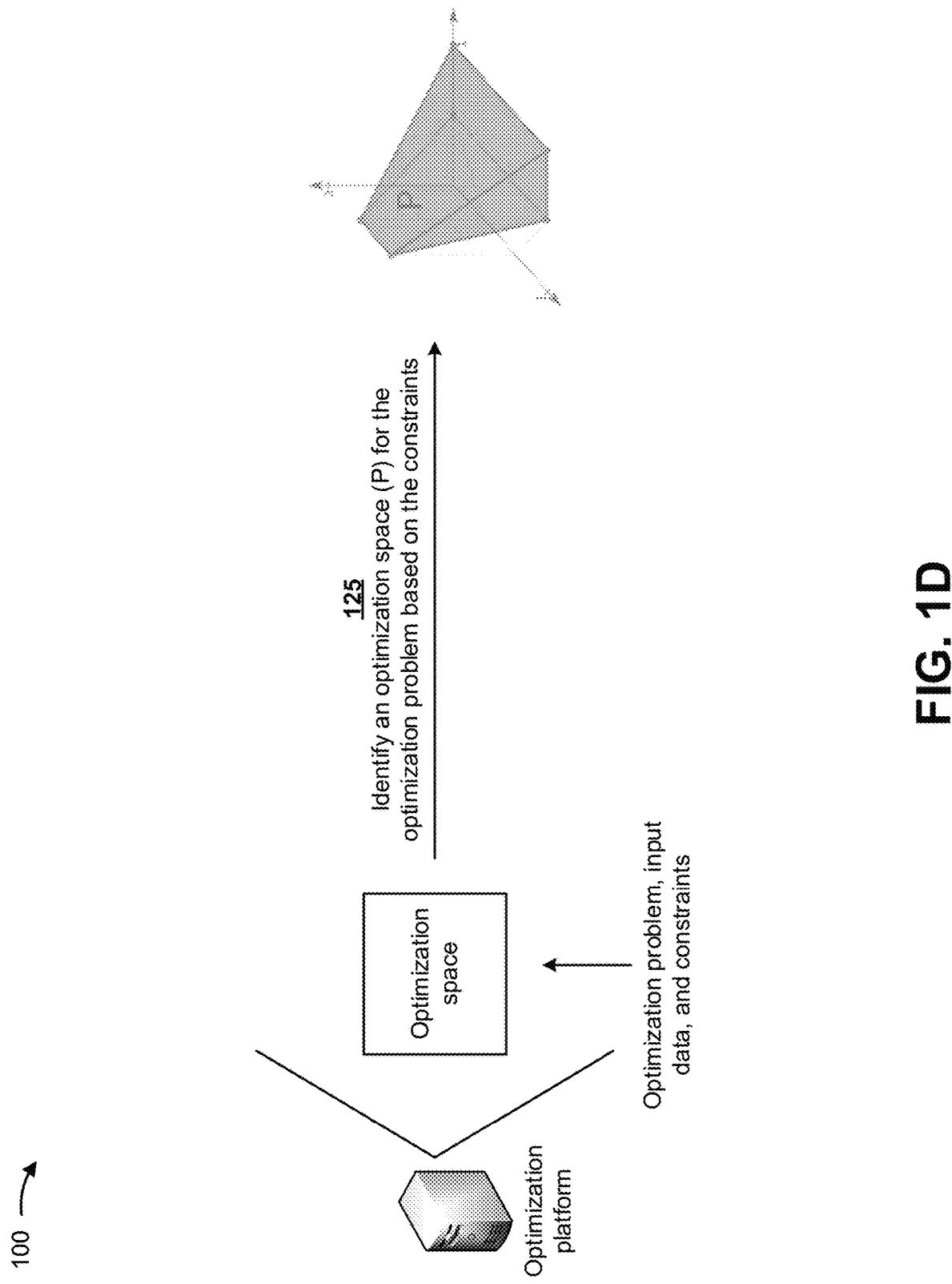

As shown in FIG. 1D, and by reference number 125, the optimization platform may identify an optimization space (P) for the optimization problem based on the constraints. In some implementations, the optimization space (e.g., a feasible region, a feasible set, a search space, a solution space, and/or the like) may include a set of candidate solutions to the optimization problem based on (e.g., that satisfy) the constraints, before the set of candidate solutions has been narrowed down. In some implementations, the optimization space may include a convex polytope (e.g., a convex polyhedron) that defines a region in multi-dimensional space with boundaries that are formed by hyperplanes and with corners that are vertices.

Figure 1E:
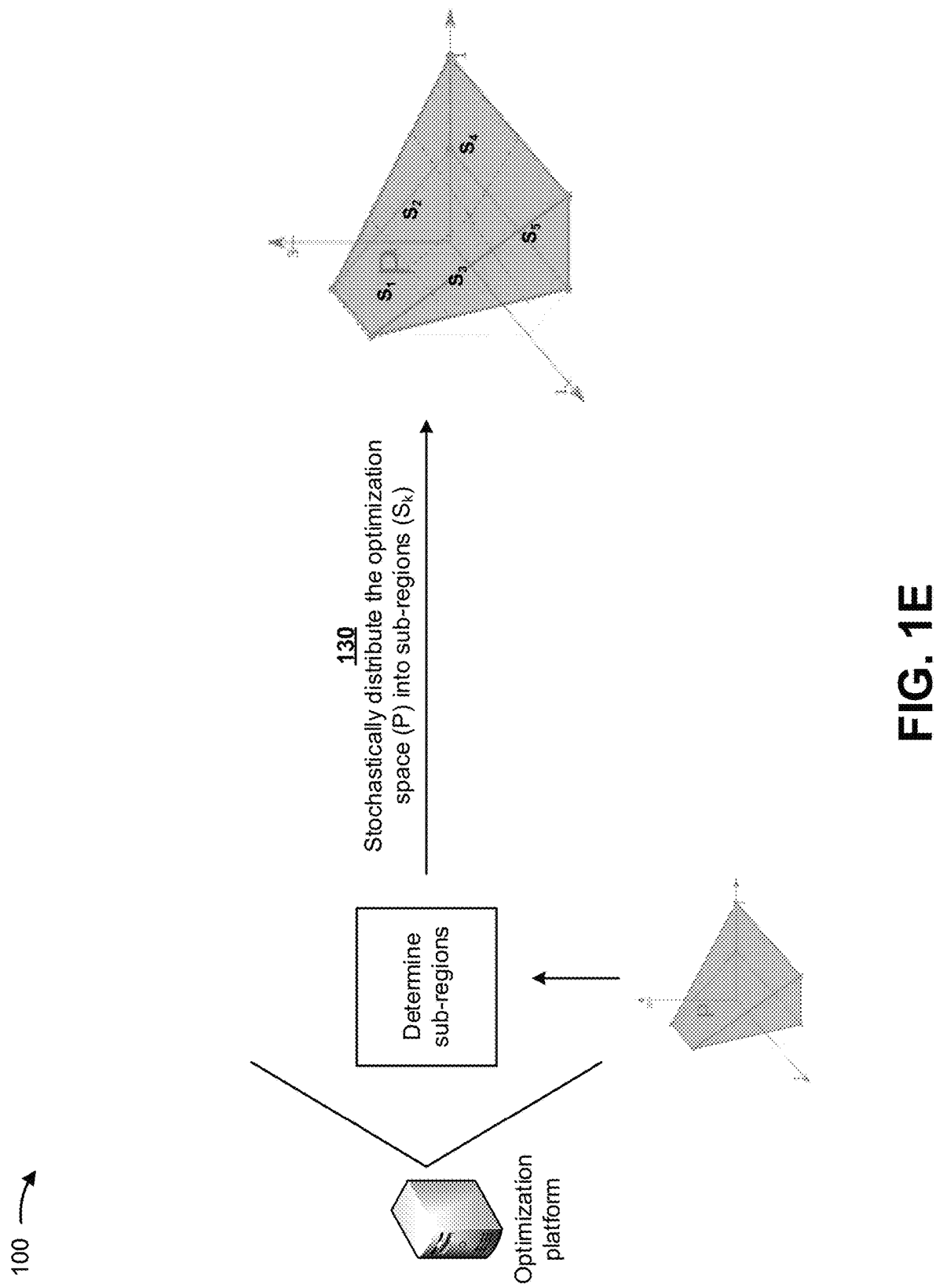

As shown in FIG. 1E, and by reference number 130, the optimization platform may stochastically distribute the optimization space (P) into sub-regions ($S_k$). In some implementations, the optimization platform may divide the optimization space into the sub-regions based on the constraints and the input data, and may rank the sub-regions based on probabilities of the sub-regions being near the target value, as described below. For example, with regard to the network speed example discussed above, the optimization platform may rank the sub-regions based on probabilities of the sub-regions being near the target value of the network speed.

In some implementations, the optimization platform may divide the entire optimization space into a quantity of sub-regions of equal size or unequal size, where the quantity of the sub-regions may be automatically determined by the optimization platform, provided by user input, and/or the like. In some implementations, the optimization platform may distribute the optimization space into the sub-regions to enable formation of a single vector for each sub-region and to determine distances between each vector and the target value (e.g., an optimal point). In some implementations, the optimization platform may select a vector that is closest to the target value, and may utilize the selected vector as an initial vector in the optimization problem, as described below. In some implementations, the optimization platform may evenly divide the optimization space (P) into the sub-regions ($S_1, S_2, \ldots, S_k$) as follows:

$$S_1 \in P, S_2 \in P, \ldots, S_k \in P.$$

Figure 1F:
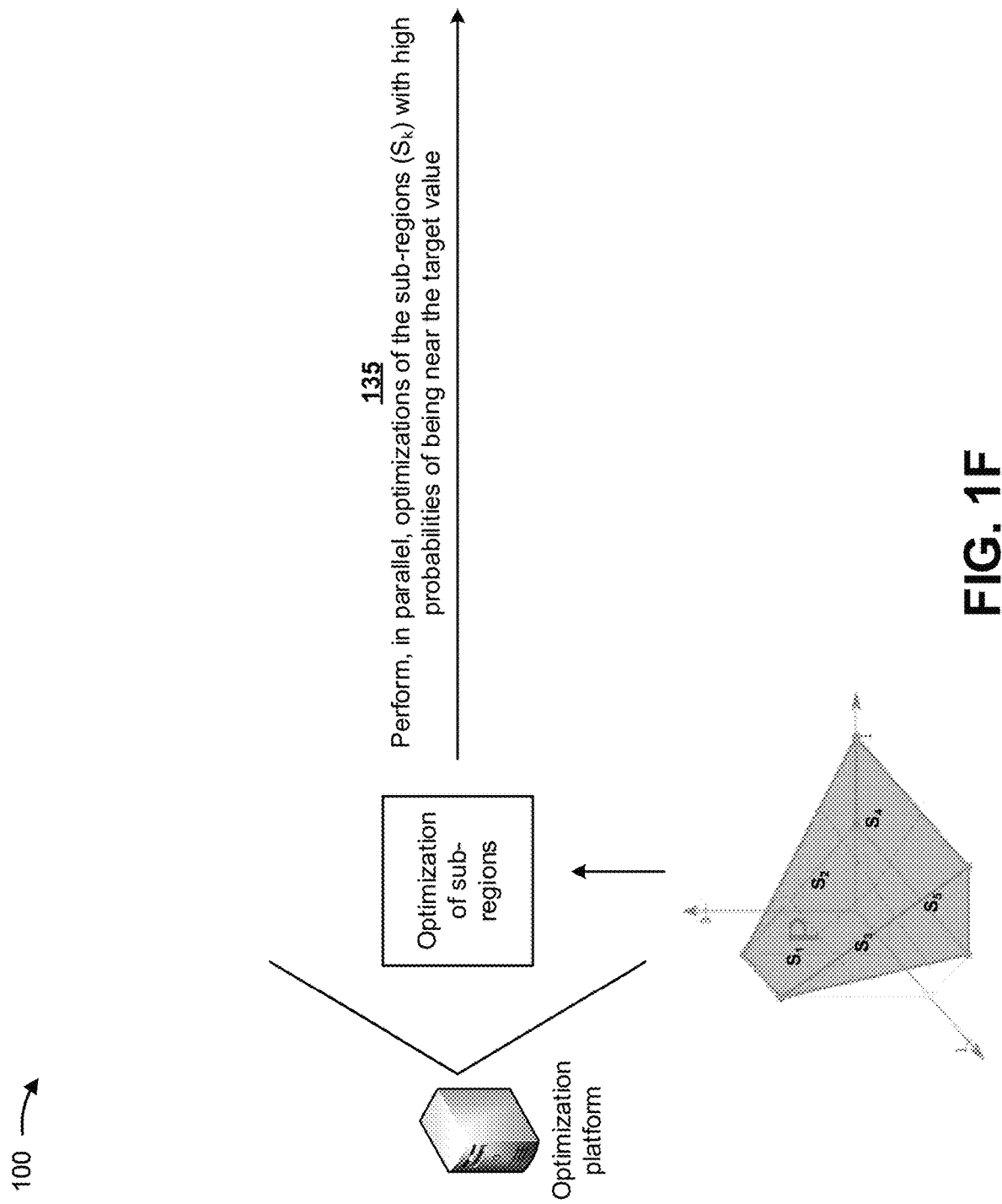

As shown in FIG. 1F, and by reference number 135, the optimization platform may perform, in parallel, optimizations of the sub-regions ($S_k$) with high probabilities of being near the target value. In some implementations, the optimization platform may determine a set of sub-regions, of the sub-regions, where each sub-region of the set of sub-regions includes or satisfies a respective threshold probability of being near the target value. In some implementations, the optimization platform may perform, in parallel, optimizations of the set of sub-regions that satisfies the threshold probability of being near the target value.

Figure 1G:
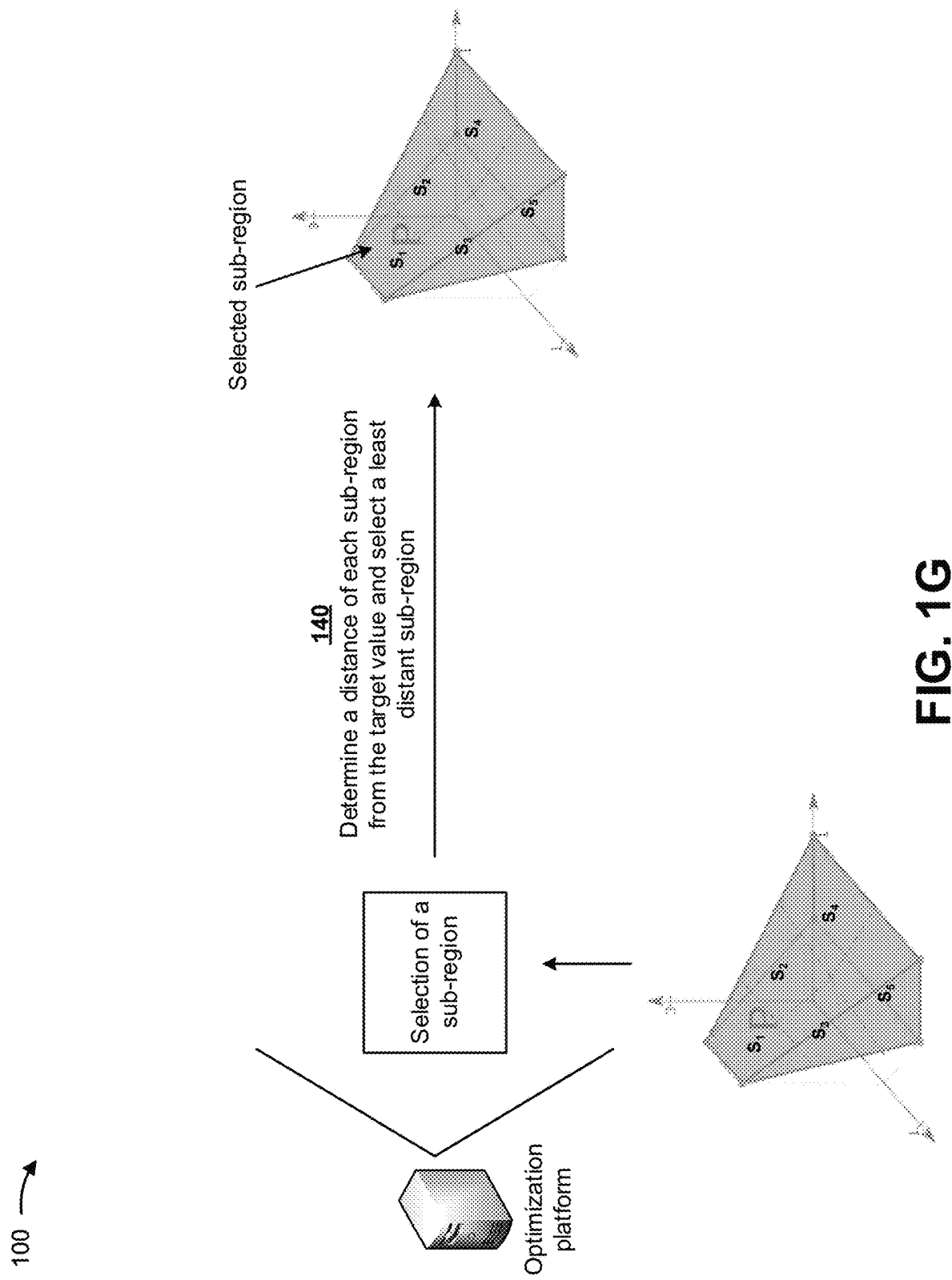

As shown in FIG. 1G, and by reference number 140, the optimization platform may determine a distance of each sub-region, of the set of sub-regions (e.g., identified as described above), from the target value, and may select a sub-region, of the set of sub-regions, that is a least distance from the target value. In some implementations, each sub-region of the set of sub-regions may be associated with corresponding vectors ($V_k$) as follows:

$$V_1 \in S_1, V_2 \in S_2, \ldots, V_k \in S_k,$$

and each vector may be assigned to a functional value ($T_k$) as follows:

$$T_1 = f(V_1), T_2 = f(V_2), \ldots, T_k = f(V_k)$$

so that the optimization platform may calculate a distance between the target value (G) and each functional value as follows:

$$T_1 - G, T_2 - G, \ldots, T_k - G.$$

In some implementations, the optimization platform may select the least distant sub-region, of the set of sub-regions, based on the calculated distances between the target value and the functional values. For example, as further shown in FIG. 1G, the optimization platform may select sub-region ($S_1$) as the least distant sub-region of the set of sub-regions.

Figure 1H:
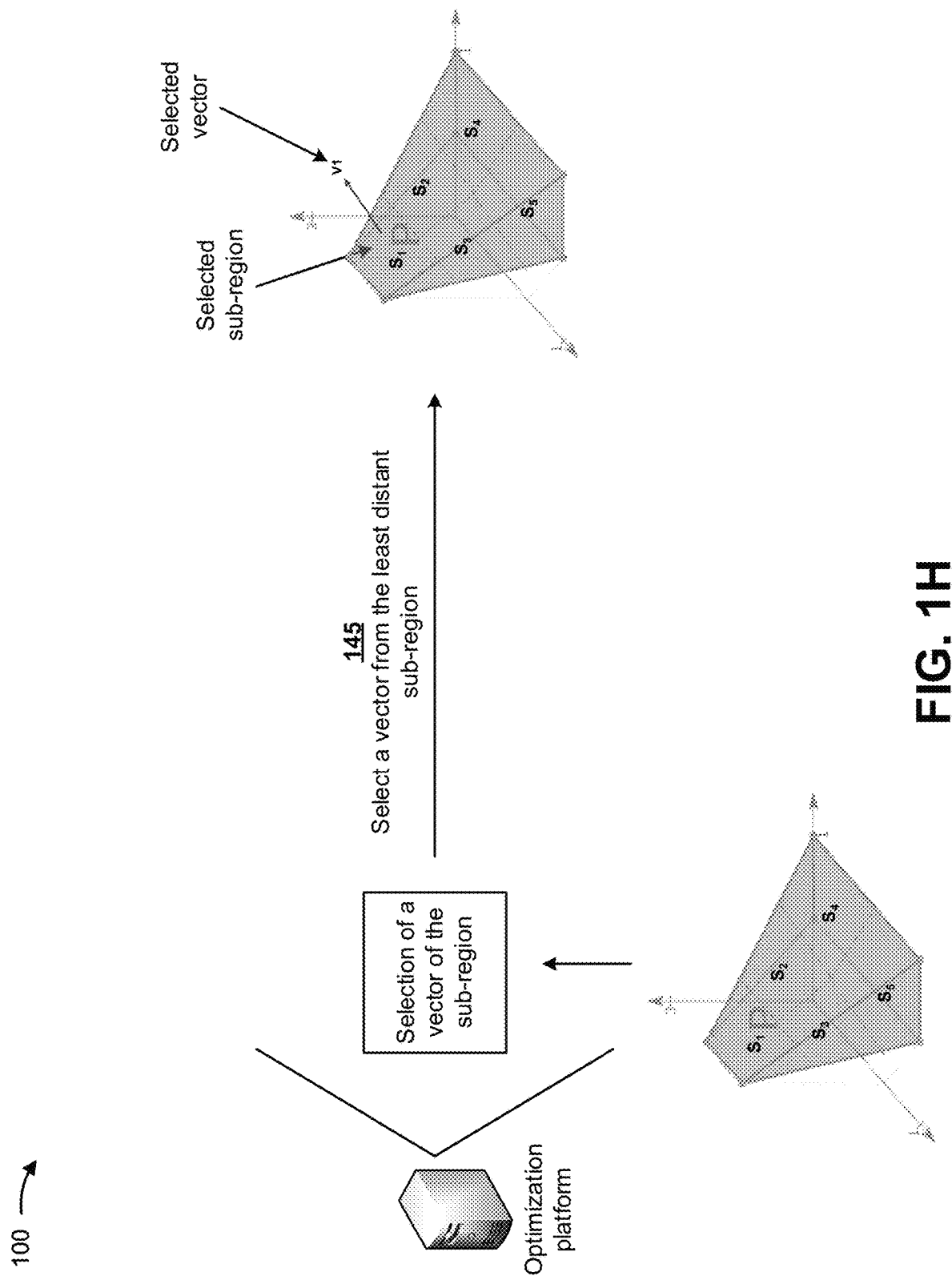

As shown in FIG. 1H, and by reference number 145, the optimization platform may select a vector (e.g., $V_1$) from the least distant sub-region (e.g., $S_1$). In some implementations, the optimization platform may select the vector ($V_1$) from the least distant sub-region based on determining a minimum distance as follows:

$$V_1 \in \mathrm{Min}\{(T_1-G)^2, (T_2-G)^2, \ldots, (T_k-G)^2\},$$

since the distance $(T_1-G)^2$ is the minimum distance.

Figure 1I:
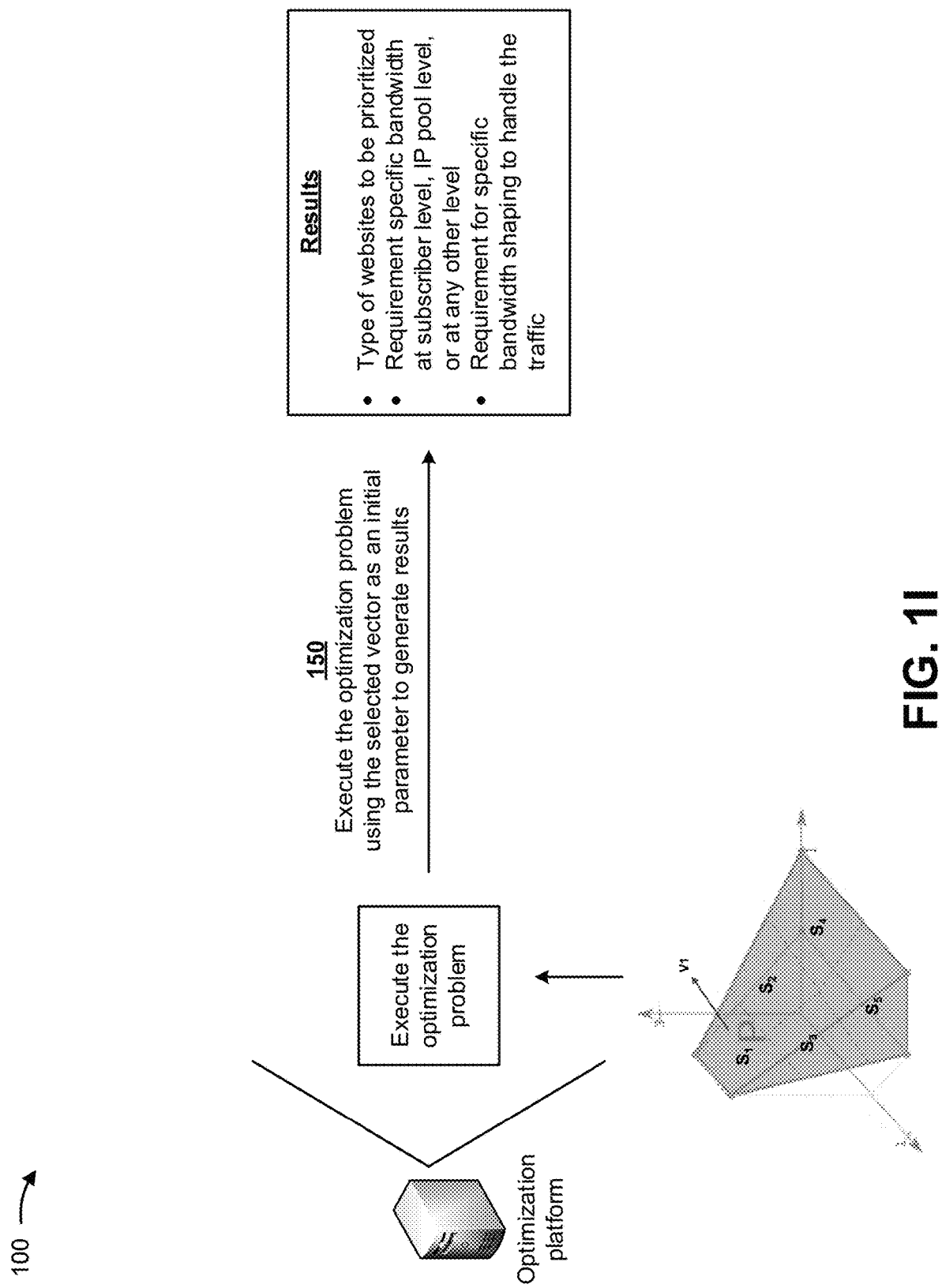

As shown in FIG. 1I, and by reference number 150, the optimization platform may execute (e.g., solve) the optimization problem using the selected vector as an initial parameter to generate results. For example, with regard to the network speed example discussed above, the results may include information indicating types of websites to be prioritized to achieve the target network speed, requirements for specific bandwidths at a subscriber level, an Internet protocol (IP) pool level, and/or the like, requirements for specific bandwidth shaping to handle traffic, and/or the like.

In this way, the optimization platform may simplify the optimization problem by dividing the optimization space into different sub-regions, and may significantly improve probabilities of solving highly complex optimization problems in short periods of time. The optimization platform may determine a vector (e.g., to be used as an initial parameter) that is unique for each optimization problem, and may execute the optimization problem at a lowest level of granularity. The optimization platform may determine, in real time or near-real time (e.g., relative to when an optimization problem is received by the optimization platform), a solution to complex optimization problems, and increasing a quantity of decision variables and/or constraints will not affect a performance of the optimization platform.

Figure 1J:
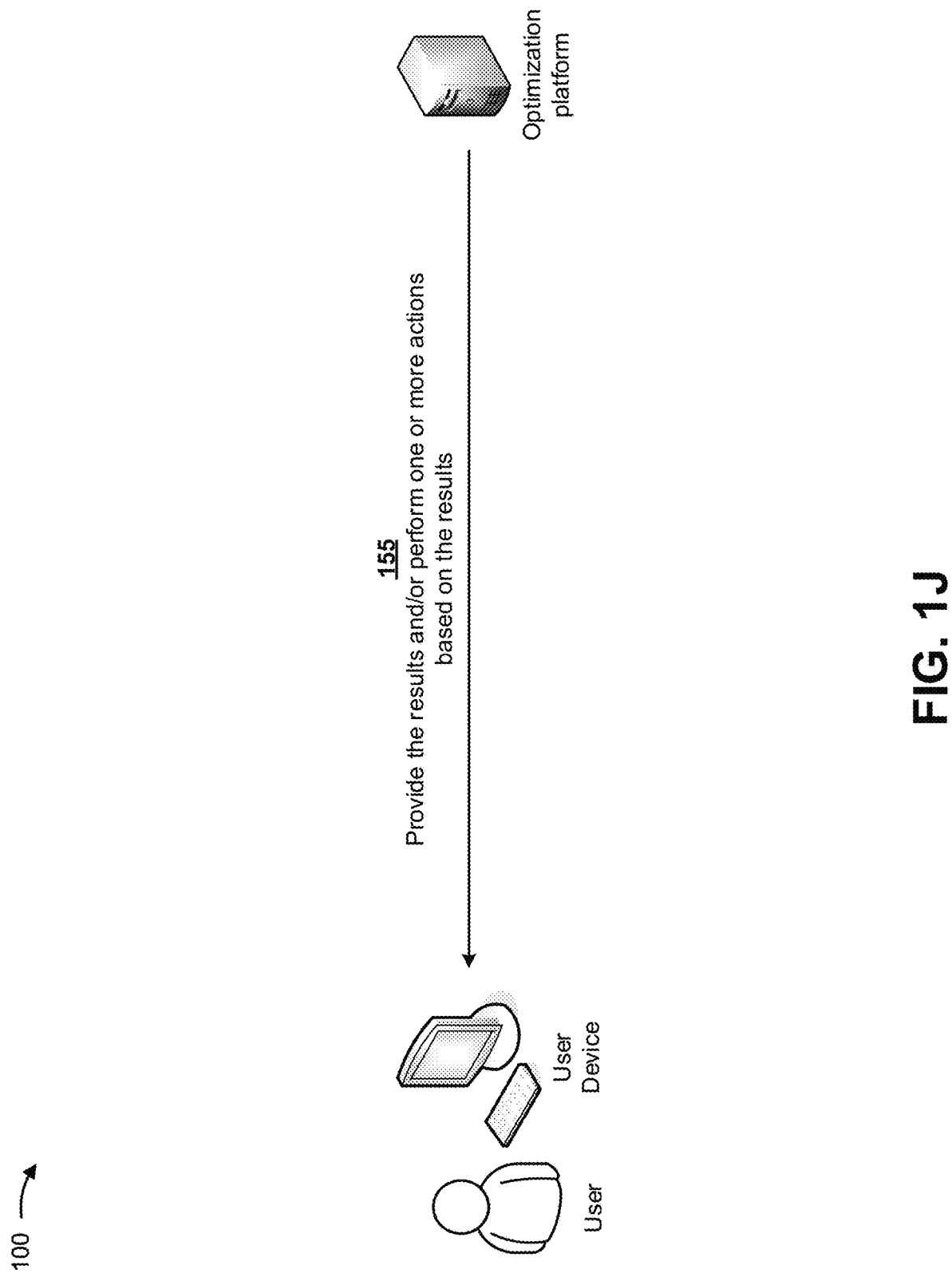

As shown in FIG. 1J, and by reference number 155, the optimization platform may provide the results of executing the optimization problem to the user device and/or may perform one or more actions based on the results. In some implementations, the user device may receive the results, and may provide the results for display to the user. In some implementations, the one or more actions, which may be automatically performed by the optimization platform based on the results, may include utilizing the results to adjust the target value. For example, if the results indicate that the target value is unattainable, the optimization platform may change the target value to a different target value and may utilize the different target value to determine the selected vector and to re-execute the optimization problem.

In some implementations, the one or more actions may include utilizing the results to recommend one or more decisions for an entity associated with the optimization problem and/or to cause the one or more decisions to be implemented. For example, if the optimization problem relates to determining a product mix, the optimization platform may determine a quantity of products of each product type to assemble from certain parts to maximize profits while not exceeding an available parts inventory, and may automatically cause one or more machines to assemble the certain parts to make the quantity of products of each product type. In another example, if the optimization problem relates to a machine allocation, the optimization platform may determine an allocation of production of a product to different machines, with different capacities, startup costs, and operating costs, to meet a production target at a minimum cost, and may automatically cause one or more devices to allocate the production of the product to the different machines accordingly. In another example, if the optimization problem relates to awarding contracts, the optimization platform may determine contracts to award to suppliers who have bid certain prices to supply products to facilities in several locations, and may automatically generate the contracts and cause one or more devices to provide the contracts to the suppliers.

In some implementations, the one or more actions may include utilizing the results to modify a process associated with the optimization problem. For example, if the optimization problem relates to product blending, the optimization platform may determine which raw materials from different sources to blend to produce a substance with certain desired qualities at a minimum cost, and may automatically cause one or more machines to blend the raw materials to produce the substance. In another example, if the optimization problem relates to process selection, the optimization platform may determine which of several processes (e.g., with different speeds, costs, etc.) should be used to make a desired quantity of product in a certain amount of time and at a minimum cost, and may automatically cause one or more devices to make the desired quantity of the product in the certain amount of time and at the minimum cost.

In some implementations, the one or more actions may include utilizing the results to optimize a network. For example, if the optimization problem relates to network optimization, the optimization platform may cause one or more network devices to be deployed in the network, at particular locations, to increase an available bandwidth of the network. In another example, if the network device is analyzing traffic and the analysis is slowing throughput of the network device, the optimization platform may cause the network device to stop analyzing the traffic, to analyze less traffic, and/or the like. In this way, the optimization platform may increase the throughput of the network device. In still another example, if a network interface is providing traffic to a network device and overloading the network device, the network resolution platform may cause the network interface to send the traffic to another network device, to offload a portion of the traffic to the other network device, and/or the like. In this way, the network resolution platform may prevent overloading of the network device and a potential network outage.

In this way, several different stages of the process for determining an optimal region in a target value optimization problem and utilizing the optimal region to perform an action are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that automatically determines an optimal region in a target value optimization problem and utilizes the optimal region to perform an action. Finally, automating the process for determining an optimal region in a target value optimization problem and utilizing the optimal region to perform an action conserves computing resources (e.g., processing resources, memory resources, and/or the like) that would otherwise be wasted in attempting to determine an optimal region in a target value optimization problem.

As indicated above, FIGS. 1A-1J are provided merely as examples. Other examples are possible and may differ from what was described with regard to FIGS. 1A-1J.

Figure 2:
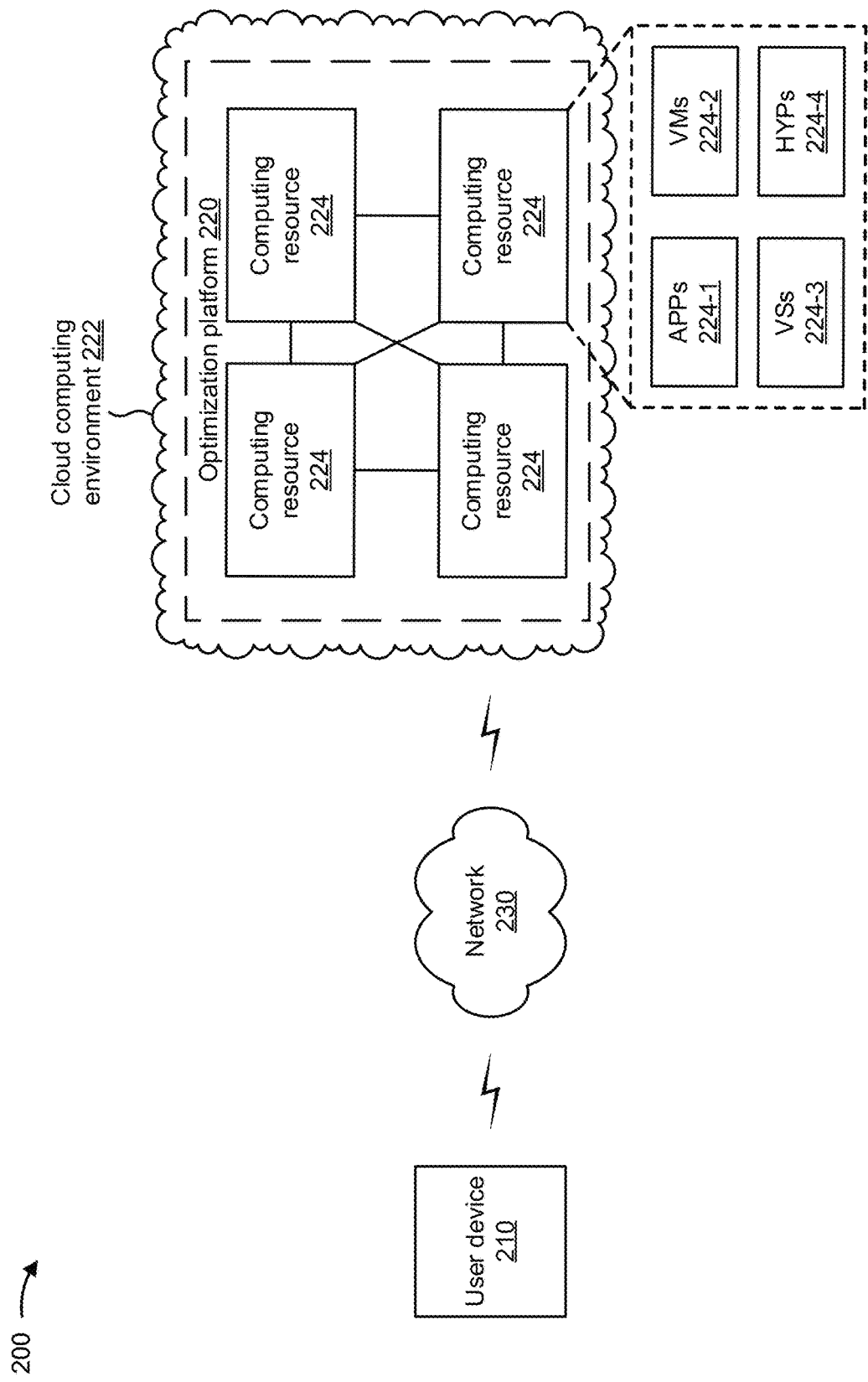
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an optimization platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, user device 210 may receive information from and/or transmit information to optimization platform 220.

Optimization platform 220 includes one or more devices that determine an optimal region in a target value optimization problem and utilize the optimal region to perform an action. In some implementations, optimization platform 220 may be designed to be modular such that certain software components may be swapped in or out depending on a particular need. As such, optimization platform 220 may be easily and/or quickly reconfigured for different uses. In some implementations, optimization platform 220 may receive information from and/or transmit information to one or more user devices 210.

In some implementations, as shown, optimization platform 220 may be hosted in a cloud computing environment 222. Notably, while implementations described herein describe optimization platform 220 as being hosted in cloud computing environment 222, in some implementations, optimization platform 220 may not be cloud-based (i.e., may be implemented outside of a cloud computing environment) or may be partially cloud-based.

Cloud computing environment 222 includes an environment that hosts optimization platform 220. Cloud computing environment 222 may provide computation, software, data access, storage, etc. services that do not require end-user knowledge of a physical location and configuration of system(s) and/or device(s) that hosts optimization platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host optimization platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with optimization platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of optimization platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
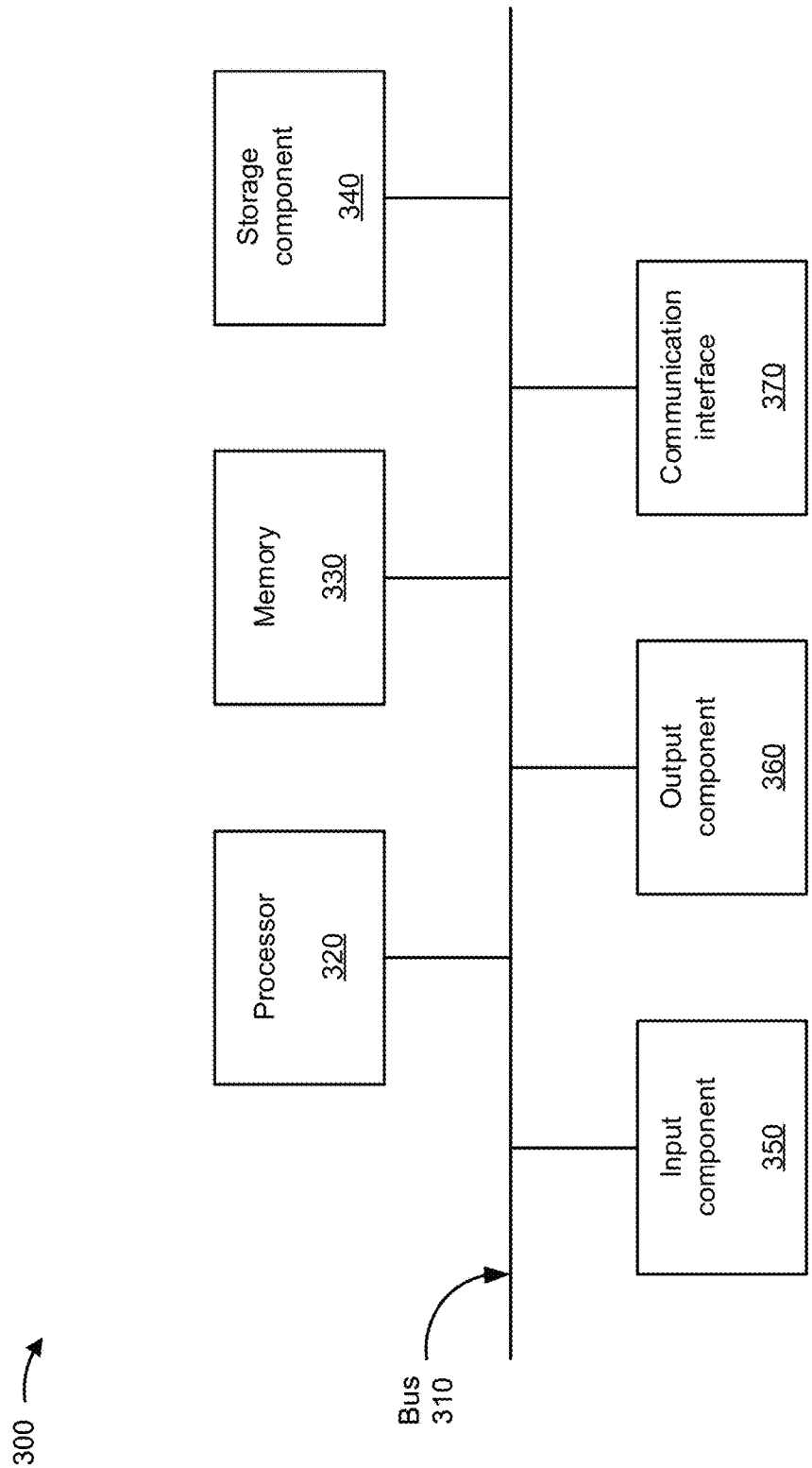
FIG. 3 is a diagram of example components of one or more devices of FIG. 2.

FIG. 3 is a diagram of example components of a device 300. Device 300 may correspond to user device 210, optimization platform 220, and/or computing resource 224. In some implementations, user device 210, optimization platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
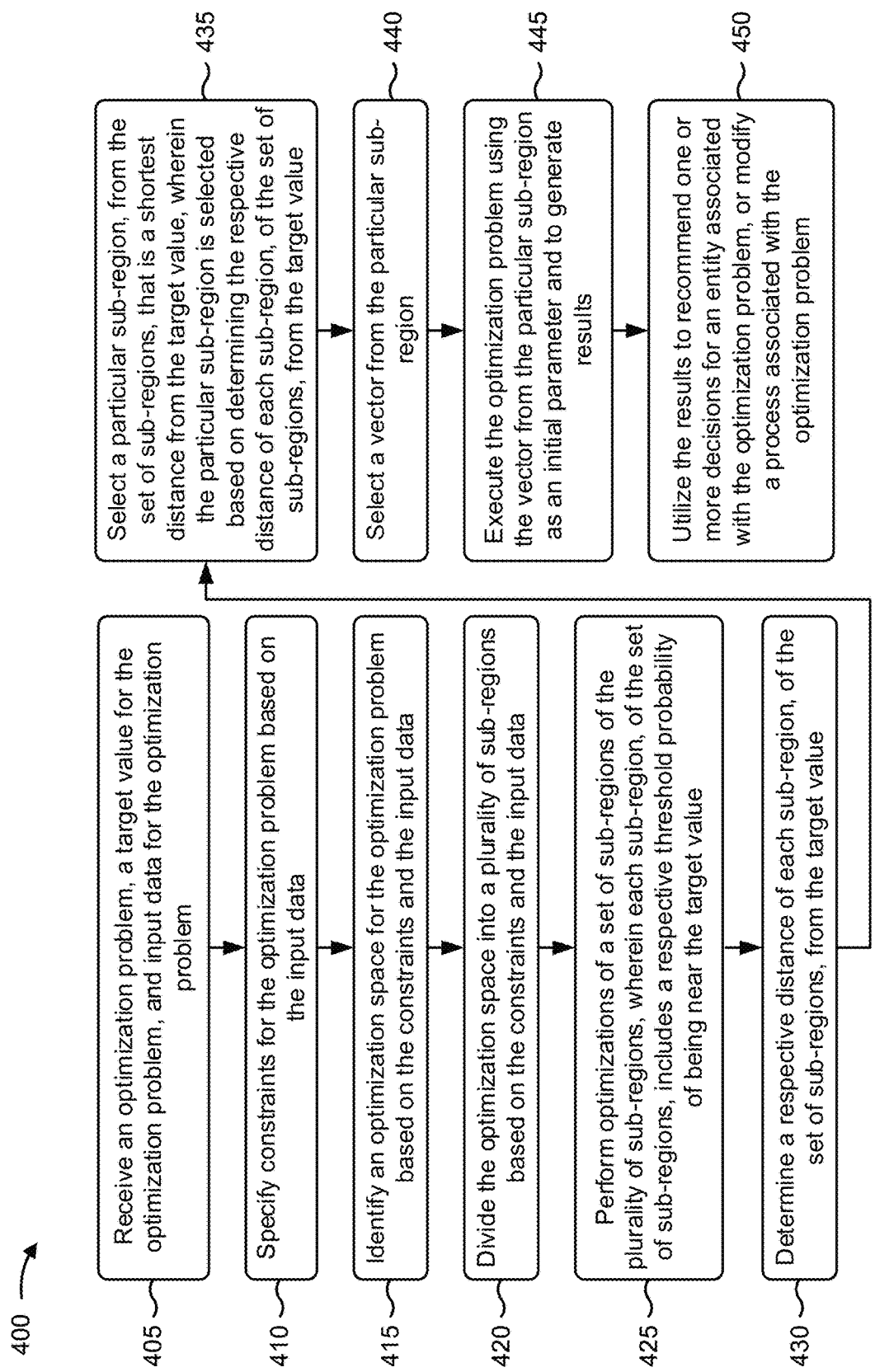
FIGS. 4-6 are flow charts of example processes for determining an optimal region in a target value optimization problem and utilizing the optimal region to perform an action.

FIG. 4 is a flow chart of an example process 400 for determining an optimal region in a target value optimization problem and utilizing the optimal region to perform an action. In some implementations, one or more process blocks of FIG. 4 may be performed by an optimization platform (e.g., optimization platform 220). In some implementations, one or more process blocks of FIG. 4 may be performed by another device or a group of devices separate from or including the optimization platform, such as a user device (e.g., user device 210).

As shown in FIG. 4, process 400 may include receiving an optimization problem, a target value for the optimization problem, and input data for the optimization problem (block 405). For example, the optimization platform (e.g., using computing resource 224, processor 320, communication interface 370, and/or the like) may receive an optimization problem, a target value for the optimization problem, and input data for the optimization problem, as described above in connection with FIGS. 1A-2.

As further shown in FIG. 4, process 400 may include specifying constraints for the optimization problem based on the input data (block 410). For example, the optimization platform (e.g., using computing resource 224, processor 320, memory 330, and/or the like) may specify constraints for the optimization problem based on the input data, as described above in connection with FIGS. 1A-2.

As further shown in FIG. 4, process 400 may include identifying an optimization space for the optimization problem based on the constraints and the input data (block 415). For example, the optimization platform (e.g., using computing resource 224, processor 320, storage component 340, and/or the like) may identify an optimization space for the optimization problem based on the constraints and the input data, as described above in connection with FIGS. 1A-2.

As further shown in FIG. 4, process 400 may include dividing the optimization space into a plurality of sub-regions based on the constraints and the input data (block 420). For example, the optimization platform (e.g., using computing resource 224, processor 320, memory 330, storage component 340, and/or the like) may divide the optimization space into a plurality of sub-regions based on the constraints and the input data, as described above in connection with FIGS. 1A-2.

As further shown in FIG. 4, process 400 may include performing optimizations of a set of sub-regions of the plurality of sub-regions, wherein each sub-region, of the set of sub-regions, includes a respective threshold probability of being near the target value (block 425). For example, the optimization platform (e.g., using computing resource 224, processor 320, memory 330, and/or the like) may perform optimizations of a set of sub-regions of the plurality of sub-regions, as described above in connection with FIGS. 1A-2. In some implementations, each sub-region, of the set of sub-regions, may include a respective threshold probability of being near the target value.

As further shown in FIG. 4, process 400 may include determining a respective distance of each sub-region, of the set of sub-regions, from the target value (block 430). For example, the optimization platform (e.g., using computing resource 224, processor 320, storage component 340, and/or the like) may determine a respective distance of each sub-region, of the set of sub-regions, from the target value, as described above in connection with FIGS. 1A-2.

As further shown in FIG. 4, process 400 may include selecting a particular sub-region, from the set of sub-regions, that is a shortest distance from the target value, wherein the particular sub-region is selected based on determining the respective distance of each sub-region, of the set of sub-regions, from the target value (block 435). For example, the optimization platform (e.g., using computing resource 224, processor 320, memory 330, and/or the like) may select a particular sub-region, from the set of sub-regions, that is a shortest distance from the target value, as described above in connection with FIGS. 1A-2. In some implementations, the particular sub-region may be selected based on determining the respective distance of each sub-region, of the set of sub-regions, from the target value.

As further shown in FIG. 4, process 400 may include selecting a vector from the particular sub-region (block 440). For example, the optimization platform (e.g., using computing resource 224, processor 320, storage component 340, and/or the like) may select a vector from the particular sub-region, as described above in connection with FIGS. 1A-2.

As further shown in FIG. 4, process 400 may include executing the optimization problem using the vector from the particular sub-region as an initial parameter and to generate results (block 445). For example, the optimization platform (e.g., using computing resource 224, processor 320, memory 330, and/or the like) may execute the optimization problem using the vector from the particular sub-region as an initial parameter and to generate results, as described above in connection with FIGS. 1A-2.

As further shown in FIG. 4, process 400 may include utilizing the results to recommend one or more decisions for an entity associated with the optimization problem, or modify a process associated with the optimization problem (block 450). For example, the optimization platform (e.g., using computing resource 224, processor 320, storage component 340, and/or the like) may utilize the results to recommend one or more decisions for an entity associated with the optimization problem, or modify a process associated with the optimization problem, as described above in connection with FIGS. 1A-2.

Process 400 may include additional implementations, such as any single implementation or any combination of implementations described below and/or described with regard to any other process described herein.

In some implementations, the optimization platform may perform one or more actions based on the results. In some implementations, when dividing the optimization space into the plurality of sub-regions, the optimization platform may perform a stochastic distribution of the optimization space to divide the optimization space into the plurality of sub-regions, where the plurality of sub-regions is mutually exclusive. In some implementations, when performing the optimizations of the set of sub-regions, the optimization platform may perform the optimizations of the set of sub-regions in parallel.

In some implementations, the results may be generated in real-time or near real-time relative to receiving the optimization problem. In some implementations, the constraints may include linear constraints, non-linear constraints, or a combination of linear constraints and non-linear constraints, and the optimization problem may include a maximization problem, or a minimization problem. In some implementations, the optimization platform may determine whether the optimization problem is a target value optimization problem, and may execute the optimization problem using a non-target value optimization when the optimization problem is not the target value optimization problem.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
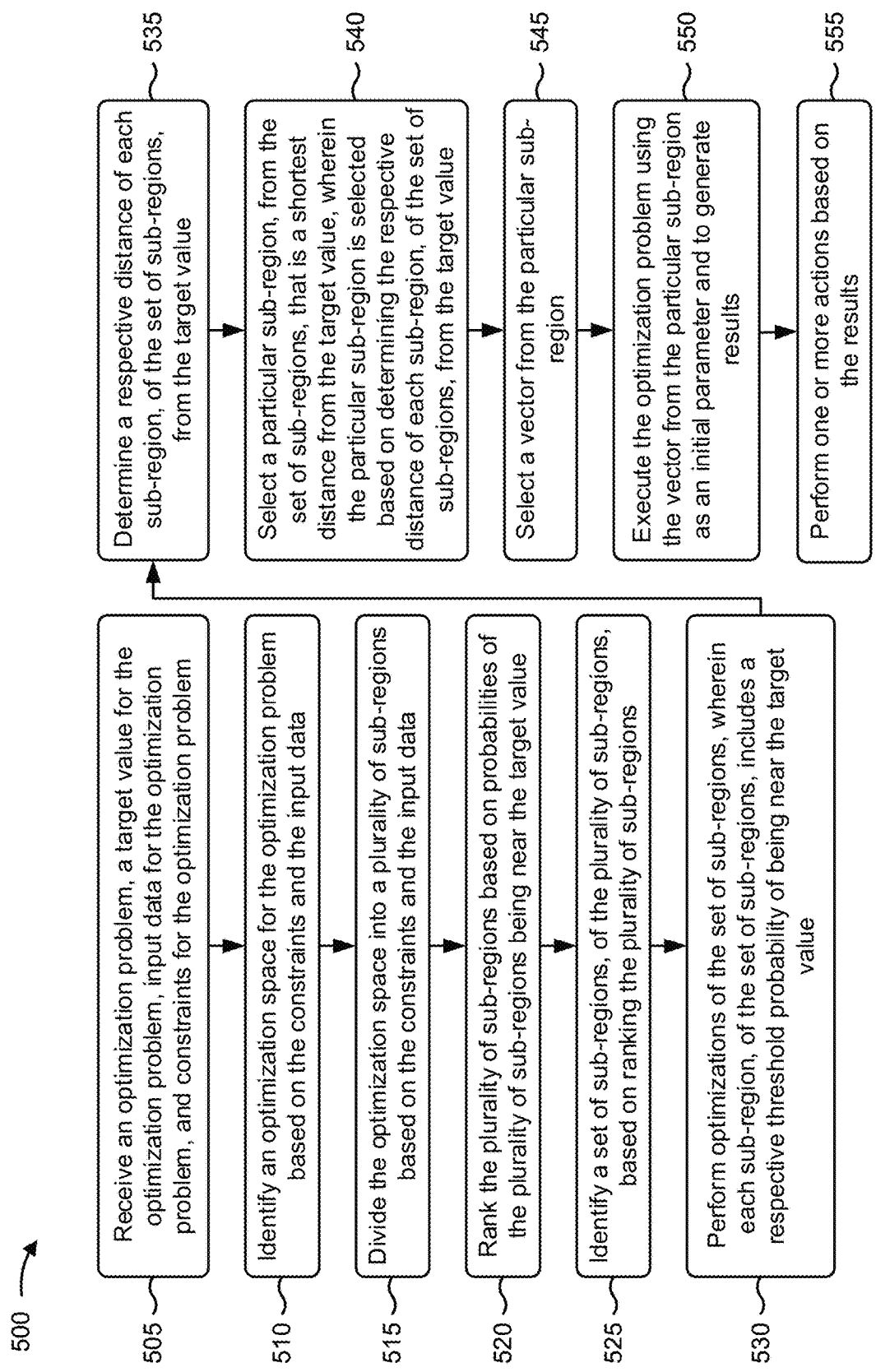

FIG. 5 is a flow chart of an example process 500 for determining an optimal region in a target value optimization problem and utilizing the optimal region to perform an action. In some implementations, one or more process blocks of FIG. 5 may be performed by an optimization platform (e.g., optimization platform 220). In some implementations, one or more process blocks of FIG. 5 may be performed by another device or a group of devices separate from or including the optimization platform, such as a user device (e.g., user device 210).

As shown in FIG. 5, process 500 may include receiving an optimization problem, a target value for the optimization problem, input data for the optimization problem, and constraints for the optimization problem (block 505). For example, the optimization platform (e.g., using computing resource 224, processor 320, communication interface 370, and/or the like) may receive an optimization problem, a target value for the optimization problem, input data for the optimization problem, and constraints for the optimization problem, as described above in connection with FIGS. 1A-2.

As further shown in FIG. 5, process 500 may include identifying an optimization space for the optimization problem based on the constraints and the input data (block 510). For example, the optimization platform (e.g., using computing resource 224, processor 320, storage component 340, and/or the like) may identify an optimization space for the optimization problem based on the constraints and the input data, as described above in connection with FIGS. 1A-2.

As further shown in FIG. 5, process 500 may include dividing the optimization space into a plurality of sub-regions based on the constraints and the input data (block 515). For example, the optimization platform (e.g., using computing resource 224, processor 320, memory 330, and/or the like) may divide the optimization space into a plurality of sub-regions based on the constraints and the input data, as described above in connection with FIGS. 1A-2.

As further shown in FIG. 5, process 500 may include ranking the plurality of sub-regions based on probabilities of the plurality of sub-regions being near the target value (block 520). For example, the optimization platform (e.g., using computing resource 224, processor 320, memory 330, storage component 340, and/or the like) may rank the plurality of sub-regions based on probabilities of the plurality of sub-regions being near the target value, as described above in connection with FIGS. 1A-2.

As further shown in FIG. 5, process 500 may include identifying a set of sub-regions, of the plurality of sub-regions, based on ranking the plurality of sub-regions (block 525). For example, the optimization platform (e.g., using computing resource 224, processor 320, memory 330, and/or the like) may identify a set of sub-regions, of the plurality of sub-regions, based on ranking the plurality of sub-regions, as described above in connection with FIGS. 1A-2.

As further shown in FIG. 5, process 500 may include performing optimizations of the set of sub-regions, wherein each sub-region, of the set of sub-regions, includes a respective threshold probability of being near the target value (block 530). For example, the optimization platform (e.g., using computing resource 224, processor 320, storage component 340, and/or the like) may perform optimizations of the set of sub-regions, as described above in connection with FIGS. 1A-2. In some implementations, each sub-region, of the set of sub-regions, may include a respective threshold probability of being near the target value.

As further shown in FIG. 5, process 500 may include determining a respective distance of each sub-region, of the set of sub-regions, from the target value (block 535). For example, the optimization platform (e.g., using computing resource 224, processor 320, memory 330, and/or the like) may determine a respective distance of each sub-region, of the set of sub-regions, from the target value, as described above in connection with FIGS. 1A-2.

As further shown in FIG. 5, process 500 may include selecting a particular sub-region, from the set of sub-regions, that is a shortest distance from the target value, wherein the particular sub-region is selected based on determining the respective distance of each sub-region, of the set of sub-regions, from the target value (block 540). For example, the optimization platform (e.g., using computing resource 224, processor 320, storage component 340, and/or the like) may select a particular sub-region, from the set of sub-regions, that is a shortest distance from the target value, as described above in connection with FIGS. 1A-2. In some implementations, the particular sub-region may be selected based on determining the respective distance of each sub-region, of the set of sub-regions, from the target value.

As further shown in FIG. 5, process 500 may include selecting a vector from the particular sub-region (block 545). For example, the optimization platform (e.g., using computing resource 224, processor 320, memory 330, and/or the like) may select a vector from the particular sub-region, as described above in connection with FIGS. 1A-2.

As further shown in FIG. 5, process 500 may include executing the optimization problem using the vector from the particular sub-region as an initial parameter and to generate results (block 550). For example, the optimization platform (e.g., using computing resource 224, processor 320, memory 330, and/or the like) may execute the optimization problem using the vector from the particular sub-region as an initial parameter and to generate results, as described above in connection with FIGS. 1A-2.

As further shown in FIG. 5, process 500 may include performing one or more actions based on the results (block 555). For example, the optimization platform (e.g., using computing resource 224, processor 320, memory 330, communication interface 370, and/or the like) may perform one or more actions based on the results, as described above in connection with FIGS. 1A-2.

Process 500 may include additional implementations, such as any single implementation or any combination of implementations described below and/or described with regard to any other process described herein.

In some implementations, when performing the one or more actions, the optimization platform may provide the results for display, utilize the results to adjust the target value, utilize the results to recommend one or more decisions for an entity associated with the optimization problem, or utilize the results to modify a process associated with the optimization problem. In some implementations, when dividing the optimization space into the plurality of sub-regions, the optimization platform may statistically and stochastically distribute the optimization space into the plurality of sub-regions, where the plurality of sub-regions is mutually exclusive.

In some implementations, when performing the optimizations of the set of sub-regions, the optimization platform may process the set of sub-regions, with an iterative model, to generate the optimizations of the set of sub-regions. In some implementations, the results may be generated in real-time or near real-time relative to receiving the optimization problem. In some implementations, the optimization problem may include a target value path problem. In some implementations, the optimization platform may determine whether the optimization problem is a target value optimization problem, and may execute the optimization problem using a non-target value optimization when the optimization problem is not the target value optimization problem.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
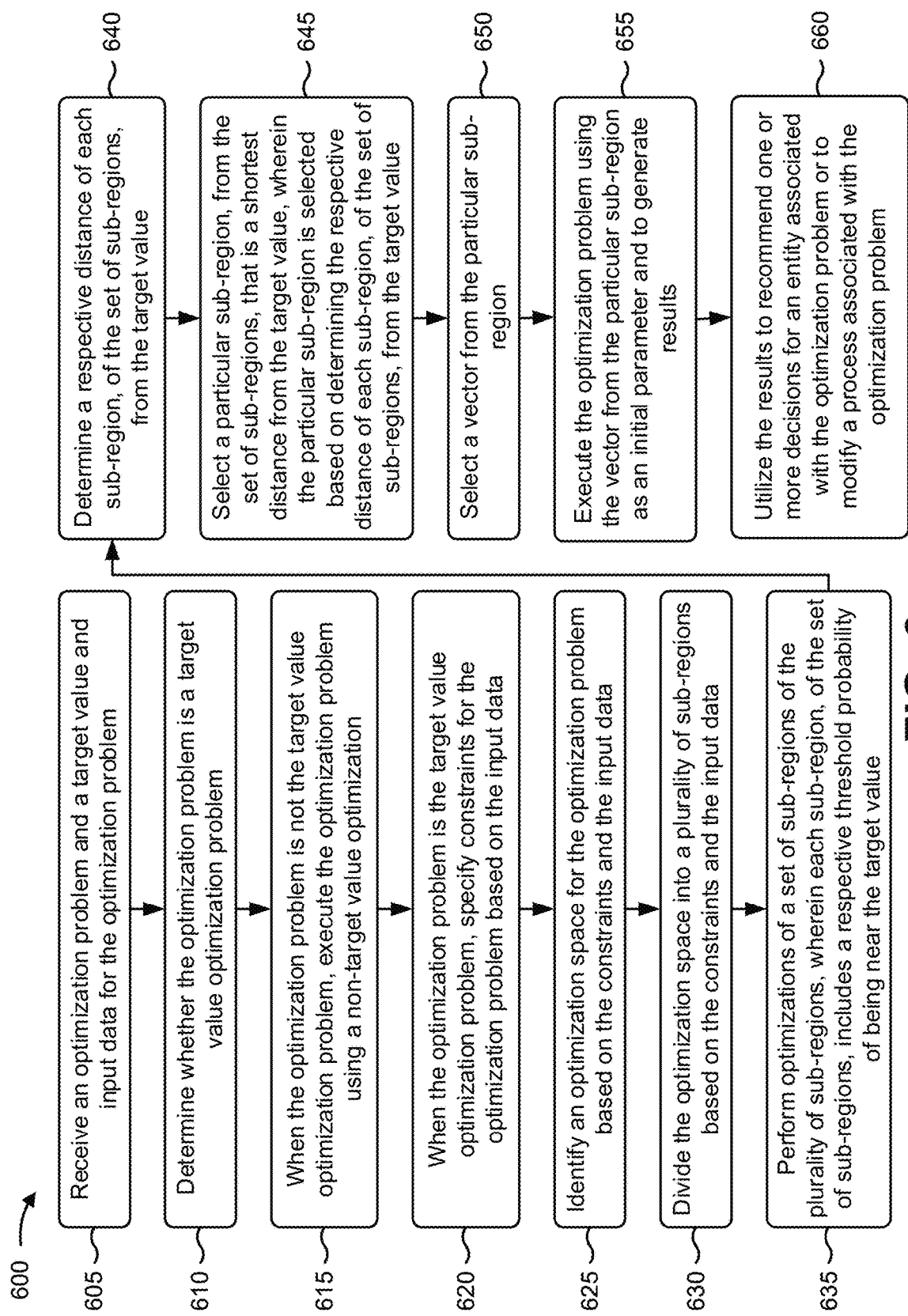

FIG. 6 is a flow chart of an example process 600 for determining an optimal region in a target value optimization problem and utilizing the optimal region to perform an action. In some implementations, one or more process blocks of FIG. 6 may be performed by an optimization platform (e.g., optimization platform 220). In some implementations, one or more process blocks of FIG. 6 may be performed by another device or a group of devices separate from or including the optimization platform, such as a user device (e.g., user device 210).

As shown in FIG. 6, process 600 may include receiving an optimization problem, a target value for the optimization problem, and input data for the optimization problem (block 605). For example, the optimization platform (e.g., using computing resource 224, processor 320, storage component 340, communication interface 370, and/or the like) may receive an optimization problem, a target value for the optimization problem, and input data for the optimization problem, as described above in connection with FIGS. 1A-2.

As further shown in FIG. 6, process 600 may include determining whether the optimization problem is a target value optimization problem (block 610). For example, the optimization platform (e.g., using computing resource 224, processor 320, memory 330, and/or the like) may determine whether the optimization problem is a target value optimization problem, as described above in connection with FIGS. 1A-2.

As further shown in FIG. 6, when the optimization problem is not the target value optimization problem, process 600 may include executing the optimization problem using a non-target value optimization (block 615). For example, when the optimization problem is not the target value optimization problem, the optimization platform (e.g., using computing resource 224, processor 320, storage component 340, and/or the like) may execute the optimization problem using a non-target value optimization, as described above in connection with FIGS. 1A-2.

As further shown in FIG. 6, when the optimization problem is the target value optimization problem, process 600 may include specifying constraints for the optimization problem based on the input data (block 620). For example, when the optimization problem is the target value optimization problem, the optimization platform (e.g., using computing resource 224, processor 320, memory 330, and/or the like) may specify constraints for the optimization problem based on the input data, as described above in connection with FIGS. 1A-2.

As further shown in FIG. 6, process 600 may include identifying an optimization space for the optimization problem based on the constraints and the input data (block 625). For example, the optimization platform (e.g., using computing resource 224, processor 320, memory 330, storage component 340, and/or the like) may identify an optimization space for the optimization problem based on the constraints and the input data, as described above in connection with FIGS. 1A-2.

As further shown in FIG. 6, process 600 may include dividing the optimization space into a plurality of sub-regions based on the constraints and the input data (block 630). For example, the optimization platform (e.g., using computing resource 224, processor 320, memory 330, and/or the like) may divide the optimization space into a plurality of sub-regions based on the constraints and the input data, as described above in connection with FIGS. 1A-2.

As further shown in FIG. 6, process 600 may include performing optimizations of a set of sub-regions of the plurality of sub-regions, wherein each sub-region, of the set of sub-regions, includes a respective threshold probability of being near the target value (block 635). For example, the optimization platform (e.g., using computing resource 224, processor 320, storage component 340, and/or the like) may perform optimizations of a set of sub-regions of the plurality of sub-regions, as described above in connection with FIGS. 1A-2. In some implementations, each sub-region, of the set of sub-regions, may include a respective threshold probability of being near the target value.

As further shown in FIG. 6, process 600 may include determining a respective distance of each sub-region, of the set of sub-regions, from the target value (block 640). For example, the optimization platform (e.g., using computing resource 224, processor 320, memory 330, and/or the like) may determine a respective distance of each sub-region, of the set of sub-regions, from the target value, as described above in connection with FIGS. 1A-2.

As further shown in FIG. 6, process 600 may include selecting a particular sub-region, from the set of sub-regions, that is a shortest distance from the target value, wherein the particular sub-region is selected based on determining the respective distance of each sub-region, of the set of sub-regions, from the target value (block 645). For example, the optimization platform (e.g., using computing resource 224, processor 320, memory 330, and/or the like) may select a particular sub-region, from the set of sub-regions, that is a shortest distance from the target value, as described above in connection with FIGS. 1A-2. In some implementations, the particular sub-region may be selected based on determining the respective distance of each sub-region, of the set of sub-regions, from the target value.

As further shown in FIG. 6, process 600 may include selecting a vector from the particular sub-region (block 650). For example, the optimization platform (e.g., using computing resource 224, processor 320, memory 330, and/or the like) may select a vector from the particular sub-region, as described above in connection with FIGS. 1A-2.

As further shown in FIG. 6, process 600 may include executing the optimization problem using the vector from the particular sub-region as an initial parameter and to generate results (block 655). For example, the optimization platform (e.g., using computing resource 224, processor 320, memory 330, and/or the like) may execute the optimization problem using the vector from the particular sub-region as an initial parameter and to generate results, as described above in connection with FIGS. 1A-2.

As further shown in FIG. 6, process 600 may include utilizing the results to recommend one or more decisions for an entity associated with the optimization problem or to modify a process associated with the optimization problem (block 660). For example, the optimization platform (e.g., using computing resource 224, processor 320, memory 330, and/or the like) may utilize the results to recommend one or more decisions for an entity associated with the optimization problem or to modify a process associated with the optimization problem, as described above in connection with FIGS. 1A-2.

Process 600 may include additional implementations, such as any single implementation or any combination of implementations described below and/or described with regard to any other process described herein.

In some implementations, the optimization platform may perform one or more actions based on the results, where the one or more actions include one or more of providing the results for display, or utilizing the results to adjust the target value. In some implementations, the optimization platform may rank the plurality of sub-regions based on probabilities of the plurality of sub-regions being near the target value, and may identify the set of sub-regions, of the plurality of sub-regions, based on ranking the plurality of sub-regions. In some implementations, when performing the optimizations of the set of sub-regions, the optimization platform may perform the optimizations of the set of sub-regions in parallel.

In some implementations, when dividing the optimization space into the plurality of sub-regions, the optimization platform may perform a stochastic distribution of the optimization space to divide the optimization space into the plurality of sub-regions, where the plurality of sub-regions is mutually exclusive. In some implementations, the constraints may include linear constraints, non-linear constraints, or a combination of linear constraints and non-linear constraints, and the optimization problem may include a maximization problem, or a minimization problem.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, an optimization problem, a target value for the optimization problem, and input data for the optimization problem,
      the optimization problem to optimize the target value for a network speed of a network;
   specifying, by the device, constraints for the optimization problem based on the input data,
      the input data relating to information associated with one or more of:
         a quantity of active users of the network, or
         a quantity of users downloading a threshold quantity of bytes from the network, and
      the constraints being based on one or more of:
         a quantity of network cell towers,
         a type of access network technology available to the network, or
         a type of bandwidth applied to the network;
   identifying, by the device, an optimization space for the optimization problem based on the constraints and the input data;

dividing, by the device, the optimization space into a plurality of sub-regions based on the constraints and the input data;
performing, by the device, optimizations of a set of sub-regions of the plurality of sub-regions,
   wherein each sub-region, of the set of sub-regions, includes a respective threshold probability of being near the target value;
determining, by the device, a respective distance of each sub-region, of the set of sub-regions, from the target value;
selecting, by the device, a particular sub-region, from the set of sub-regions, that is a shortest distance from the target value,
   wherein the particular sub-region is selected based on determining the respective distance of each sub-region, of the set of sub-regions, from the target value;
selecting, by the device, a vector from the particular sub-region;
executing, by the device, the optimization problem using the vector from the particular sub-region as an initial parameter and to generate results; and
utilizing, by the device, the results to:
   recommend one or more decisions for an entity associated with the network speed, or
   modify a process associated with the network speed.

2. The method of claim 1, further comprising:
performing one or more actions based on the results.

3. The method of claim 1, wherein dividing the optimization space into the plurality of sub-regions comprises:
performing a stochastic distribution of the optimization space to divide the optimization space into the plurality of sub-regions,
   wherein the plurality of sub-regions is mutually exclusive.

4. The method of claim 1, wherein performing the optimizations of the set of sub-regions comprises:
performing the optimizations of the set of sub-regions in parallel.

5. The method of claim 1, wherein the results are generated in real-time or near real-time relative to receiving the optimization problem.

6. The method of claim 1, wherein:
the constraints include:
   linear constraints,
   non-linear constraints, or
   a combination of linear constraints and non-linear constraints; and
the optimization problem includes:
   a maximization problem, or
   a minimization problem.

7. The method of claim 1, further comprising:
determining whether the optimization problem is a target value optimization problem; and
executing the optimization problem using a non-target value optimization when the optimization problem is not the target value optimization problem.

8. A device, comprising:
one or more memories; and
one or more processors, communicatively coupled to the one or more memories, to:
   receive an optimization problem, a target value for the optimization problem, input data for the optimization problem, and constraints for the optimization problem,
      the optimization problem to optimize the target value for a network speed of a network;
   identify, using a machine learning model, an optimization space for the optimization problem based on the constraints and the input data,
      the machine learning model to:
         receive the input data relating to information associated with one or more of:
            a quantity of active users of the network, or
            a quantity of users downloading a threshold quantity of bytes from the network; and
         output the optimization space based on the constraints,
            the constraints being based on one or more of:
            a quantity of network cell towers,
            a type of access network technology available to the network, or
            a type of bandwidth applied to the network;
   divide the optimization space into a plurality of sub-regions based on the constraints and the input data;
   rank the plurality of sub-regions based on probabilities of the plurality of sub-regions being near the target value;
   identify a set of sub-regions, of the plurality of sub-regions, based on ranking the plurality of sub-regions;
   perform optimizations of the set of sub-regions,
      wherein each sub-region, of the set of sub-regions, includes a respective threshold probability of being near the target value;
   determine a respective distance of each sub-region, of the set of sub-regions, from the target value;
   select a particular sub-region, from the set of sub-regions, that is a shortest distance from the target value,
      wherein the particular sub-region is selected based on determining the respective distance of each sub-region, of the set of sub-regions, from the target value;
   select a vector from the particular sub-region;
   execute the optimization problem using the vector from the particular sub-region as an initial parameter and to generate results; and
   perform one or more actions based on the results.

9. The device of claim 8, wherein, the one or more processors, when performing the one or more actions, are to one or more of:
provide the results for display,
utilize the results to adjust the target value,
utilize the results to recommend one or more decisions for an entity associated with the optimization problem, or
utilize the results to modify a process associated with the optimization problem.

10. The device of claim 8, wherein the one or more processors, when dividing the optimization space into the plurality of sub-regions, are to:
statistically and stochastically distribute the optimization space into the plurality of sub-regions,
   wherein the plurality of sub-regions is mutually exclusive.

11. The device of claim 8, wherein the one or more processors, when performing the optimizations of the set of sub-regions, are to:
process the set of sub-regions, with an iterative model, to generate the optimizations of the set of sub-regions.

12. The device of claim 8, wherein the results are generated in real-time or near real-time relative to receiving the optimization problem.

13. The device of claim 8, wherein the optimization problem includes a target value path problem.

14. The device of claim 8, wherein the one or more processors are further to:
determine whether the optimization problem is a target value optimization problem; and
execute the optimization problem using a non-target value optimization when the optimization problem is not the target value optimization problem.

15. A non-transitory computer-readable medium storing instructions, the instructions comprising:
one or more instructions that, when executed by one or more processors of a device, cause the one or more processors to:
receive an optimization problem, a target value for the optimization problem, and input data for the optimization problem,
the optimization problem to optimize the target value for a network speed of a network;
determine whether the optimization problem is a target value optimization problem; and
when the optimization problem is not the target value optimization problem:
execute the optimization problem using a non-target value optimization; or
when the optimization problem is the target value optimization problem:
specify constraints for the optimization problem based on the input data;
identify an optimization space for the optimization problem based on the constraints and the input data,
the input data relating to information associated with one or more of:
a quantity of active users of the network, or
a quantity of users downloading a threshold quantity of bytes from the network; and
the constraints being based on one or more of:
a quantity of network cell towers,
a type of access network technology available to the network, or
a type of bandwidth applied to the network;
divide the optimization space into a plurality of sub-regions based on the constraints and the input data;
perform optimizations of a set of sub-regions of the plurality of sub-regions,
wherein each sub-region, of the set of sub-regions, includes a respective threshold probability of being near the target value;
determine a respective distance of each sub-region, of the set of sub-regions, from the target value;
select a particular sub-region, from the set of sub-regions, that is a shortest distance from the target value,
wherein the particular sub-region is selected based on determining the respective distance of each sub-region, of the set of sub-regions, from the target value;
select a vector from the particular sub-region;
execute the optimization problem using the vector from the particular sub-region as an initial parameter and to generate results; and
utilize the results to recommend one or more decisions for an entity associated with the network speed or to modify a process associated with the network speed.

16. The non-transitory computer-readable medium of claim 15, wherein the instructions further comprise:
one or more instructions that, when executed by the one or more processors, cause the one or more processors to:
perform one or more actions based on the results,
wherein the one or more actions include one or more of:
providing the results for display, or
utilizing the results to adjust the target value.

17. The non-transitory computer-readable medium of claim 15, wherein the instructions further comprise:
one or more instructions that, when executed by the one or more processors, cause the one or more processors to:
rank the plurality of sub-regions based on probabilities of the plurality of sub-regions being near the target value; and
identify the set of sub-regions, of the plurality of sub-regions, based on ranking the plurality of sub-regions.

18. The non-transitory computer-readable medium of claim 15, wherein the one or more instructions, that cause the one or more processors to perform the optimizations of the set of sub-regions, cause the one or more processors to:
perform the optimizations of the set of sub-regions in parallel.

19. The non-transitory computer-readable medium of claim 15, wherein the one or more instructions, that cause the one or more processors to divide the optimization space into the plurality of sub-regions, cause the one or more processors to:
perform a stochastic distribution of the optimization space to divide the optimization space into the plurality of sub-regions,
wherein the plurality of sub-regions is mutually exclusive.

20. The non-transitory computer-readable medium of claim 15, wherein:
the constraints include:
linear constraints,
non-linear constraints, or
a combination of linear constraints and non-linear constraints; and
the optimization problem includes:
a maximization problem, or
a minimization problem.

* * * * *